(12) United States Patent
Ginsberg

(10) Patent No.: US 9,500,482 B2
(45) Date of Patent: Nov. 22, 2016

(54) FLIGHT PLANNING SYSTEM AND METHOD USING FOUR-DIMENSIONAL SEARCH

(71) Applicant: On Time Systems, Inc., Eugene, OR (US)

(72) Inventor: Matthew L. Ginsberg, Eugene, OR (US)

(73) Assignee: On Time Systems, Inc., Eugene, OR (US)

( * ) Notice: Subject to any disclaimer, the term of this patent is extended or adjusted under 35 U.S.C. 154(b) by 0 days.

(21) Appl. No.: 13/938,577

(22) Filed: Jul. 10, 2013

(65) Prior Publication Data

US 2014/0032106 A1    Jan. 30, 2014

Related U.S. Application Data

(60) Provisional application No. 61/676,389, filed on Jul. 27, 2012.

(51) Int. Cl.
| | | |
|---|---|---|
| G01C 21/00 | (2006.01) | |
| G01C 21/20 | (2006.01) | |
| G08G 5/00 | (2006.01) | |
| G05D 1/00 | (2006.01) | |

(52) U.S. Cl.
CPC ............. *G01C 21/00* (2013.01); *G01C 21/20* (2013.01); *G05D 1/0005* (2013.01); *G08G 5/0034* (2013.01)

(58) Field of Classification Search
CPC ....... G01C 21/00; G01C 21/20; G05D 1/005; G08G 5/0034
USPC ........................................................ 701/538
See application file for complete search history.

(56) References Cited

U.S. PATENT DOCUMENTS

| | | | | |
|---|---|---|---|---|
| 4,812,990 | A * | 3/1989 | Adams ................. | G06F 17/509 701/3 |
| 5,880,408 | A | 3/1999 | Schreiner | |
| 6,085,147 | A * | 7/2000 | Myers ................ | G01C 21/3453 342/33 |
| 6,134,500 | A | 10/2000 | Tang et al. | |
| 8,010,242 | B1 * | 8/2011 | Ginsberg et al. ................. | 701/3 |

* cited by examiner

*Primary Examiner* — Fadey Jabr
*Assistant Examiner* — Yazan Soofi
(74) *Attorney, Agent, or Firm* — Fenwick & West LLP

(57) ABSTRACT

A system and method for flight planning determines an optimal route by setting an initial departure weight or range of such weights for an aircraft traveling from a departure airport to a destination airport, defining a network of nodes for potentially legal routes, labeling each node with a graph of fuel needed to reach that node either as a function of flight duration or as a function of flight duration and departure weight, selecting or discarding routes when conditions at a node of that route are favorable or violated, selecting a preferred route, departure weight and duration for the desired payload and minimizing fuel for the desired route and payload.

18 Claims, 6 Drawing Sheets

FLIGHT PLANNING SYSTEM AND METHOD USING FOUR-DIMENSIONAL SEARCH

RELATED APPLICATIONS

This application claims the benefit of U.S. provisional application Ser. No. 61/676,389 filed on Jul. 27, 2012, the contents of which are incorporated herein by reference in their entirety.

BACKGROUND

1. Field of Art

The subject matter described herein generally relates to flight planning for aircraft, and more specifically, to determining flight paths, speed, payload and fuel parameters that optimize one or more desired considerations (e.g., fuel, duration of travel) for an aircraft voyage.

2. Description of the Related Art

Flight planning has been important to air travel since before the advent of fixed-wing aircraft. Determining the range of an aircraft to deliver a given payload, the fuel required for such a trip, the bearings and altitudes to be used are all critical considerations for safe and efficient air travel.

As fuel costs continue to rise and as concern about global climate change increases, a great amount of attention has been given in recent years to efficiency in air travel. Likewise, military applications look to efficiency, not only to minimize cost of operations but also to allow existing aircraft to transport greater payloads over longer distances. Efficiency also often translates into increased useful life for individual airframes and the ability to transport more cargo between aircraft overhauls.

For example, NASA has studied whether use of staged airline voyages, rather than long-haul trips, might lead to reduced emissions resulting from air travel. See Andrew S. Hahn, *Staging Airline Service*, American Institute of Aeronautics and Astronautics (2007), available at ntrs.nasa.gov/archive/nasa/casi.ntrs.nasa.gov/20070032063_2007032029.pdf. That paper addresses a number of analytical approaches for determining aircraft range, from the classic Breguet Range Equation to more recent approaches. Government agencies of other countries have likewise addressed similar issues. In J. Vankan, et al., *Multi-Objective Optimisation of Aircraft Range and Fuel Consumption*, National Aerospace Laboratory NLR (Amsterdam, the Netherlands, 2007), available at http://www.vivaceproject.com/content/advanced/57Vankan.pdf, various adjustments and corrections are applied to traditional Breguet range calculations in an attempt to achieve Pareto optimal improvements in aircraft design.

Central to many of these approaches is the recognition that an aircraft's range is based in part on its weight, which includes both the weight of the fuel it carries and of the static payload it is carrying. Recognition that a vehicle's payload capacity is related to the fuel it is carrying is not unique to aircraft; analysis of ships and land vehicles also recognizes the "fuel as payload" issue. See, e.g., U.S. Pat. No. 5,880,408 (to assignee-at-issue Caterpillar, Inc. and disclosing techniques for compensating for fuel weight in payload measurement system).

Vehicular payloads are typically static over time, in that the weight of the payload does not vary from the beginning of a voyage to the end. Fuel is an aspect of payload that is virtually unique in that it varies dramatically in weight during the voyage.

It has long been recognized that in aircraft, the varying weight of fuel is far too significant to be simply ignored, or even just averaged, in determining flight plans. Because fuel weight changes so dramatically over the course of a voyage, special computational techniques need to be used to account for the weight of fuel. In one simplistic approach, an iterative approach is used to gradually approach realistic estimation of flight characteristics such as range, endurance, and the like. Not only is such an approach inaccurate, it is computationally intensive and therefore either slow or expensive to use.

Another approach is described in U.S. Pat. No. 6,134,500 (to assignee-at-issue United Air Lines, Inc.), that uses "backward" search techniques that start by considering how much weight the plane is desired to have at the conclusion of a voyage from one point to another, and then works backward to determine how much weight it should have on descent, during cruise and finally on initial climb. Such backward processing simplifies the range of calculations needed to determine initial fuel loads and preferred airspeeds, altitudes and routing during flight.

Yet another approach to flight planning does not attempt to load enough fuel on the plane to clear all possible safety parameters for the journey from a worst-case perspective. Instead, a reasonably expected case is used for fuel loading calculations, and then divert locations are determined so that if conditions worse than expected arise, the aircraft can make an enroute determination to refuel using a "reclear" procedure. Thus, far less fuel needs to be carried than for the conventional worst-case planning technique. However, more accurate and computationally simple mechanisms than the conventional ones for determining fuel loading are still applicable to such improved approaches to flight planning In military applications, another factor to be considered is the availability of in-flight refueling. Such refueling allows aircraft to take off with lighter fuel loads (and therefore heavier static payloads) than would normally be possible, or to take off in shorter distances than would be possible with full fuel tanks Determining where and how often to refuel to minimize cost can have dramatic impacts on overall mission costs.

Commonly owned U.S. Pat. No. 8,010,242 addresses a number of these issues by including an initial, intentionally false assumption that the entire gross payload capacity of a plane is used for fuel. This assumption is used to seed an initial set of legal routes, after which an assumption is made that some fuel is removed, remaining legal routes are re-calculated, and so on until results are achieved that permit the desired amount of actual (i.e., non-fuel) payload to be placed on the aircraft.

In spite of the long-understood need to consider fuel weight in flight planning, there remains a need for a computationally simple approach to help in determining factors such as flight path, fueling logistics and the like. Recently, the complexity of such planning has increased as additional parameters have been requested by aircraft operators. For instance, there is now interest in optimizing among fixed payload requirements, fuel requirements, ground track, altitude and speed. The first two factors are often selected initially as constraints, leaving the task as the optimum search within the four remaining dimensions. No quantitative methods exist that permit simple yet efficient determination of such factors.

SUMMARY

As disclosed herein, an optimization system is used that simplifies trip planning by route segments from a start point, the route segments collectively comprising a number of intermediate nodes; associating a multidimensional function relating to a first set of factors with each node; repeatedly choosing a subset of the segments responsive to the function and measure of acceptability at one or more of the nodes; expanding analysis to adjoining route segments by further selection responsive to the function and measure of acceptability, and selecting a preferred route based on the choosing and expanding.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description, when taken in conjunction with the accompanying drawings, in which.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of the disclosed subject matter.

System Architecture

Figure 2:
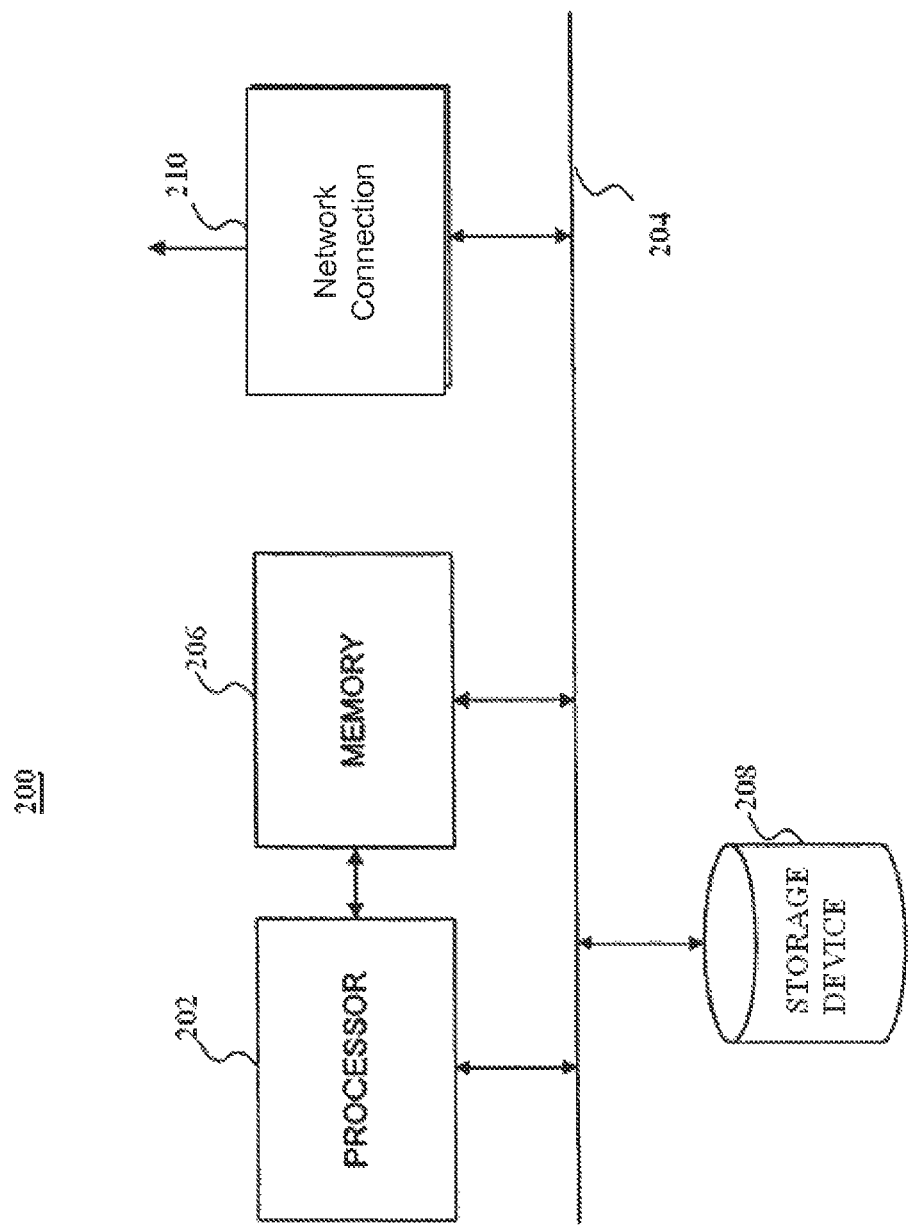
FIG. 2 is a high-level block diagram illustrating a computer system for implementing a preferred embodiment.

FIG. 2 is a high-level block diagram illustrating a computer system 200 for flight planning as described herein. In a preferred embodiment, a conventional computer programmed for operation as described herein is used to implement computer system 200. Processor 202 is conventionally coupled to memory 206 and bus 204. For applications in which higher performance is required, multiple processors 202 are employed. Also coupled to the bus 204 are memory 206, storage device 208, and network connection 210. For clarity of discussion, other system components such as a keyboard, graphics adapter, pointing device, and display are not separately illustrated.

In a typical embodiment, processor 202 is any general or specific purpose processor such as an INTEL Pentium compatible central processing unit (CPU), as applicable for the processing power required for any particular application. Storage device 208 is any device capable of holding large amounts of data, like a hard drive, compact disc read-only memory (CD-ROM), digital versatile disc (DVD), or combinations of such devices. Memory 206 holds instructions and data used by the processor 202. The pointing device, such as a mouse, track ball, light pen, touch-sensitive display, is used in combination with the keyboard to input data into the computer system 200. The graphics adapter displays images and other information on the display. The network connection 210 couples the computer system 200 to the user's network environment, such as a local or wide area network (not shown).

A program for flight planning according to one embodiment is preferably stored on the storage device 208, loaded from memory 206, and executed on the processor 202. Alternatively, hardware or software modules are stored elsewhere within the computer system 200 for performing actions as described herein, or are accessed remotely via network connection 210.

The results of the program's operation are output to the display, and, as desired, to additional output devices and output formats (not shown), including, for example, printers, fax devices, and image or printer files. Additionally, if desired they are passed as input to other software processes, such as those for handling other aspects of flight management.

Exemplary Flight Planning Scenario

Figure 3:
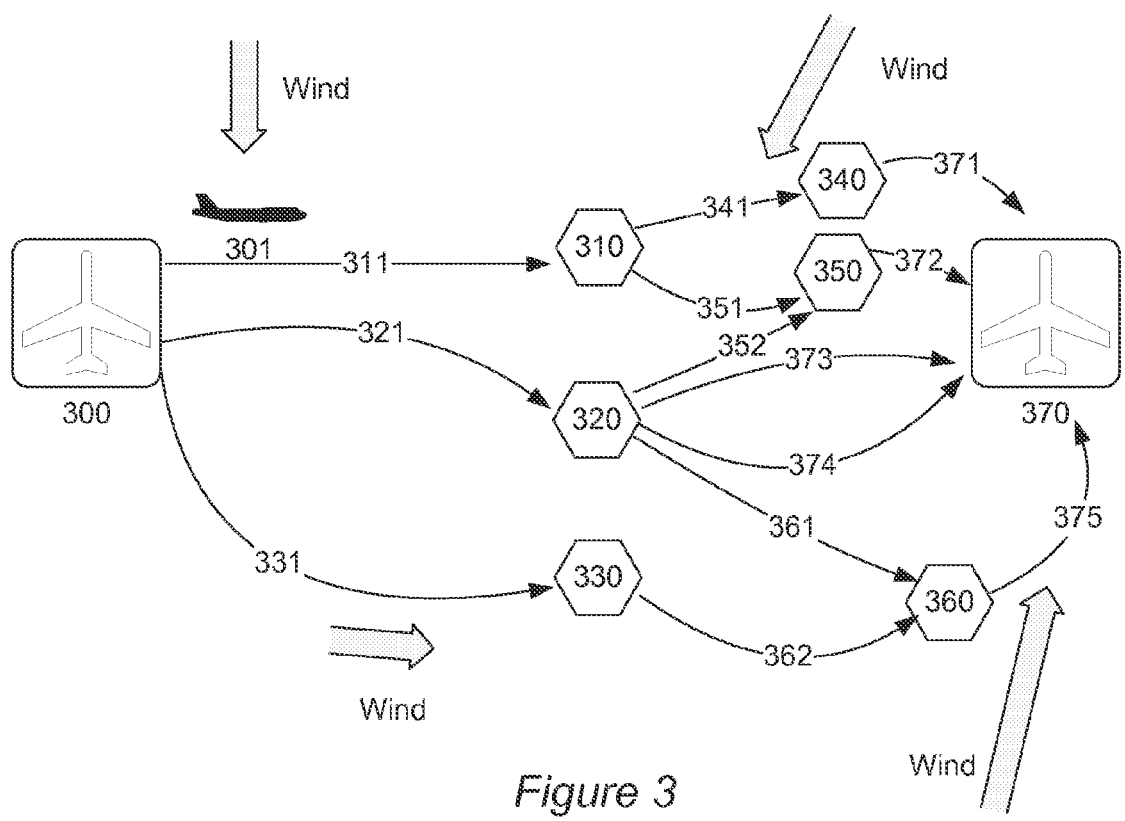
FIG. 3 depicts potential legal routes for a particular flight from one location to another, showing exemplary issues to be considered in flight planning, according to one embodiment.

Referring now to FIG. 3, consider airport 300 to be a departure airport and airport 370 to be a destination airport. A flight plan for delivery of a payload from airport 300 to airport 370 is generated, in a preferred embodiment, based on a variety of factors. In some situations, a flight path may be largely unconstrained, while in others, significant constraints may limit "legal" paths to a relatively small number of options. In many areas in the world that exhibit flight congestion, only set paths (including not only latitude/longitude coordinates but altitudes as well) are available for air travel. Likewise, political considerations relating to a possible fly-over country may prevent a pilot from using a path that would otherwise be considered optimal.

Safety considerations sometimes present other constraints. For example, some planes are not rated for certain over-water operations and must remain within a specified maximum distance from locations suitable for emergency landings (e.g., according to conventional ETOPS rules). Often, planes are required to maintain sufficient fuel at all times to make it to identified "divert" landing locations in adverse conditions such as headwinds and must not choose flight paths that will put them beyond range from such a divert location.

Fuel cost imposes still another constraint, and this constraint may be correlated in some way with other factors, such as wind direction and strength. For instance, FIG. 3 illustrates a situation in which wind at the beginning of the trip is different in both direction and intensity than near the destination.

To denote various ways for airplane 301 to travel from departure airport 300 to destination airport 370, a number of intermediate nodes (310, 320, 330, 340, 350, 360) are defined. In some embodiments, these nodes are selected based on simple geographical grids (e.g., every 10 nautical miles along the great circle path between airports 300 and 370 and then parallel paths every 10 nautical miles distant from the great circle path). In other embodiments, the nodes are selected in other ways, such as at intermediate emergency landing locations. In still other embodiments, the nodes are selected to correspond to radio navigation beacons or other waypoints, to correspond to navigational aids, to correspond to defined reporting points along recognized airways, or to correspond to points with integral coordinates of both latitude and longitude. Those skilled in the art will recognize a number of ways to identify and locate such intermediate nodes.

The number of "legal" flight paths between airports 300 and 370 is thus defined using such nodes. For simplicity and clarity in illustration, only a small number of nodes, e.g., 310, are illustrated in FIG. 3, but in reality there are hundreds or thousands of such nodes considered for a typical flight planning scenario (as suggested by use of some paths between nodes, e.g., path 351 between node 310 and node 350, that are themselves nonlinear because they represent multiple paths connecting many nodes, and as further suggested by showing multiple paths between the same two nodes, e.g., 373, 374). Whether a path is legal may be determined by a number of factors, as mentioned above, but for whatever geographic, political, weather or other constraints may exist, the graph of possible paths in FIG. 3 represents the only possible set of paths that airplane 301 may choose to travel.

Some paths are much longer geographically than others, but may still be preferred, for instance because they provide favorable winds. For example, the paths 331/362/375 between airports 300 and 370 are in the aggregate significantly longer than some alternatives, but provide a fully tailwind journey for airplane 301.

Those skilled in the art will recognize that while FIG. 3 illustrates a two-dimensional flight path for purposes of clarity, a three-dimensional grid of nodes may also be used, with altitude as the third dimension. Those skilled in the art will also recognize that in various environments of use, it may be advantageous to select other dimensions to use to define networks of nodes, such as initial aircraft weight or aircraft speed along each particular leg. In such an implementation, there would be many arcs from (say) node 320 to a node geographically collocated with node 360.

Method of Operation

Figure 1:
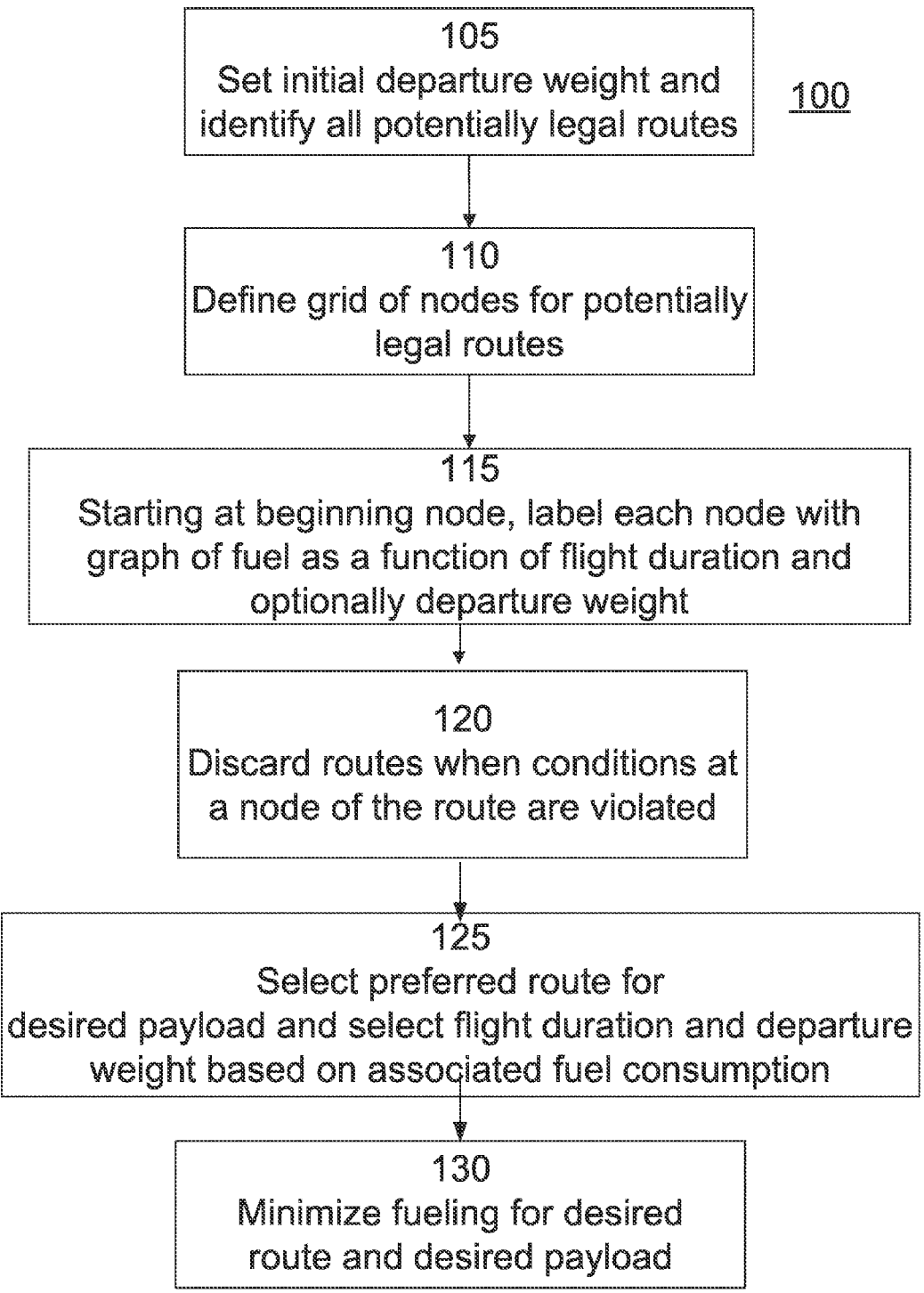
FIG. 1 is a flowchart indicating the high-level steps performed for flight planning, according to one embodiment.

FIG. 1 illustrates, in flowchart form, one example of a method 100 to accomplish flight planning, according to a preferred embodiment.

At the outset, an initial departure weight (or optionally, range of departure weights) for the aircraft is selected. This assumption is reconciled with actual fuel and payload capacity at a later stage. Using this assumption, a set of "legal" routes is determined 105 from a departure airfield, e.g., airport 300, to a destination airfield, e.g., 370. Taking the example shown in FIG. 3, there are seven such routes. In actual practice, and particularly for long-haul routes, there may be many more legal routes, and those may differ due to any of the factors discussed above. To give an example, FIG. 3 illustrates a situation in which for some routes there is a cross-wind over much of the journey, with only a minor headwind component near the destination, and for other routes, there is tailwind for the entire journey. Were conditions different, e.g., a strong headwind expected over the entire area, the longer route represented by paths 331/362/375 might be discounted at the outset as not feasible. Conventional flight planning products and services, such as those provided by the Jeppesen subsidiary of Boeing Commercial Aviation Services, are used in some embodiments to help determine such legal routes.

As discussed above in connection with FIG. 3, a network, or grid, of nodes is defined 110 to break up the overall path of travel for each potentially legal route into smaller segments. As discussed above, in various embodiments different techniques are used to define such networks and determine the nodes to use for further processing. For example, in one embodiment a grid is simply overlaid on a portion of a map including the start point and end point (and in some embodiments, some buffer space around the start point and end point to take into account initial and final routing that may be away from the destination), and all intersecting grid lines are considered nodes deserving of initial processing.

To analyze each potential route, each node, e.g., 310, is labeled with information pertaining to the characteristics of that node. In some known routing systems, waypoints are considered based on some single dimension such as time or fuel required to reach that node. In the system described herein, each node is labeled not with a single-dimensional value, but instead with a graph, or function, establishing a range of factors.

Figure 4:
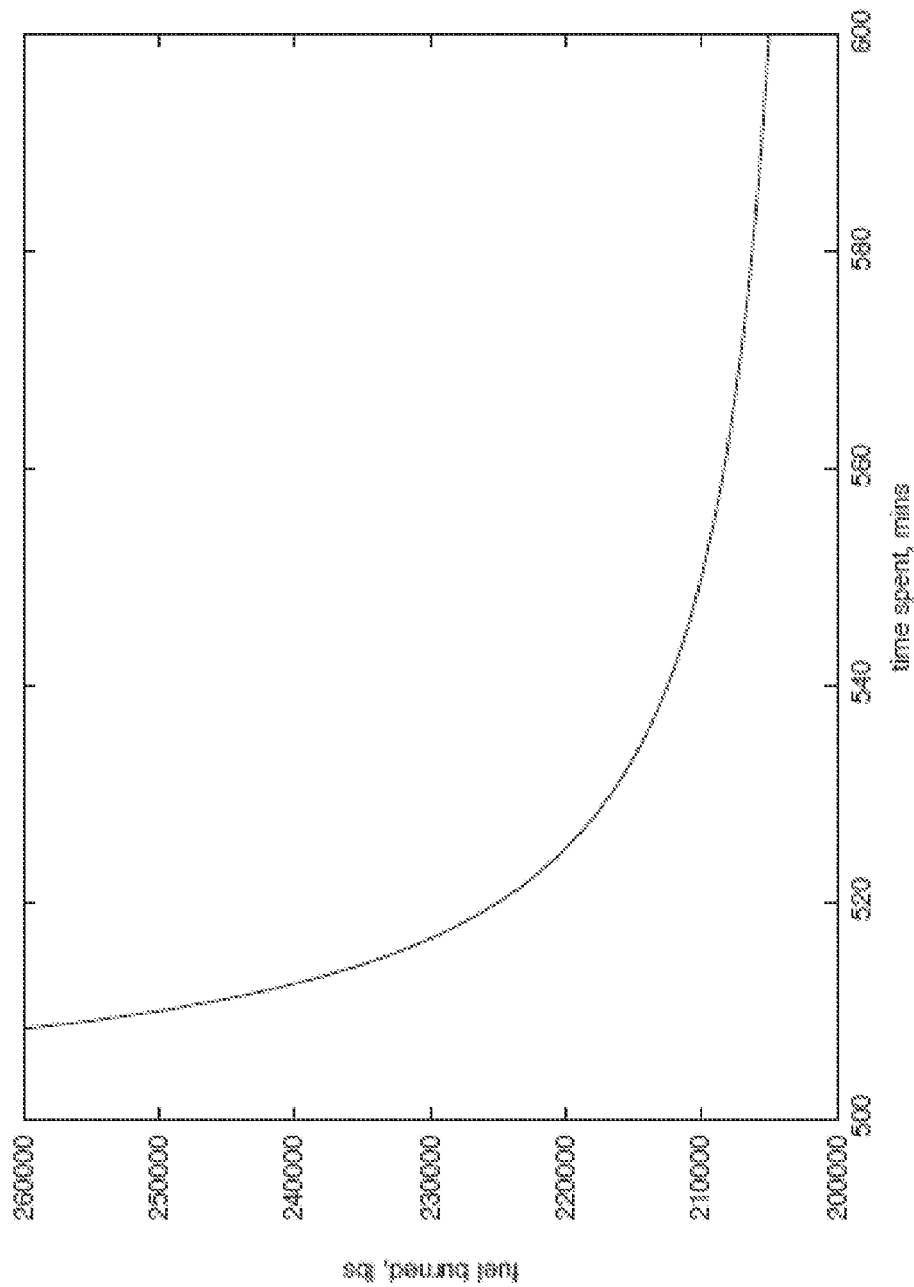
FIG. 4 depicts an example graph of fuel usage as a function of duration of travel.

Referring now to FIG. 4, there is illustrated such a graph 400, showing the relationship between the fuel required to reach the node and the time required to reach the node. Those skilled in the art will recognize that in some embodiments, time/fuel to reach the node from the departure airport can be used, while in other embodiments, time/fuel to reach the node from some specific prior node can be used, as long as other determinations discussed herein are made in a consistent manner. In still other embodiments, the graph identifies fuel burned as a function of both time spent and the weight of the aircraft at the point from which the time is measured.

Referring once again to FIG. 1, at step 120 processing continues by discarding any segments going to or from a node for which there is no acceptable solution. In other words, consider hypothetically a voyage that needs to be completed in 7 hours. For each node, a computation is made as to allowable combinations of fuel usage and trip duration, as discussed above. If such computation determines that, say, no matter what path is taken to get to node 350 it will take over 7 hours to reach that node, all of the corresponding segments that necessarily traverse node 350 are rejected (in this instance, segments 351, 352 and 372 are rejected and no longer considered). In certain embodiments, it may be realized that a segment has no acceptable solution not because the destination cannot be reached in the desired time, but because another approach will always lead to a more efficient flight plan. As an example, if there are two paths P1 and P2 in FIG. 3 to node 360 but the graph associated with P1 shows more fuel consumed than the graph associated with P2 (independent of departure weight or other relevant concerns), then the path associated with P1 can be discarded if node 360 is on the final flight path.

In other embodiments, rather than discarding nodes based on lack of acceptable solution, nodes that appear most favorable are selected for expansion, thus allowing partial paths to be gradually built based on expansion of those groups of adjacent segments providing the most favorable combination of factors.

It is important to realize that, having computed the graph that labels any specific node in the network, it becomes possible to compute the graph that should label successor nodes. If a node x is a successor to a node y, then the fuel required to reach node x via node y after time t is the minimum over all times t' of the fuel required to reach node y in time t' and then go from node y to node x in time t-t'. A similar argument can be made in the case that the fuel is a function of both departure weight and time spent.

When all of the nodes and corresponding segments have been considered (whether by being computed and rejected or not, by being determined irrelevant due to a prior node being rejected, or otherwise), a preferred route, duration of flight and in some embodiments departure weight are selected from among the segments still under consideration. In one embodiment, this selection is performed based on weighting factors (e.g., for all valid paths, multiply the distance of each path relative to the shortest distance by 0.3, multiply the fuel used for each path relative to the most fuel-intensive path by 0.7, and multiply the duration of the journey relative to that of the longest-duration path by 0.9, then add those factors together and pick the path with the smallest weighted sum). In some military applications, such weighting factors may be determined by a "mission index" that defines the relative importance of such factors, and in embodiments where mission indices are available these are used for selecting among the candidate paths.

Finally, once a route, temporal duration and payload are selected, in step 130 a determination is made as to the fueling that is most appropriate for that path and the desired fixed payload.

The processing described in FIG. 1 is advantageous in that even though it provides six-dimensional optimization (payload and fuel as two dimensions, ground track as two dimensions, and finally altitude and speed) the search space used is equivalent to that of only three or four dimensions, which results in much less processing overhead than would be required for pure six dimensional searching, particularly for large search spaces.

Further, such processing permits these various factors to be considered simultaneously without undue overhead, as computations are limited only to nodes that appear deserving of further consideration. Thus, the search space is both limited by relevance in a general manner, and also not needlessly expanded by considering a node that is favorable as to one factor, only to later discard it because it is not favorable with regard to another factor.

In related embodiments, a set of partial paths from the start point to the end point is identified as discussed above. The multidimensional function for each partial path is evaluated as described above, and certain partial paths are selected for further consideration based on the relative properties of the functions. For instance, the best 10% of the partial paths, based on the evaluated functions, may be selected. Alternatively, the single best partial path may be selected and expanded, with the expansions then replacing the original partial path in the set of partial paths. Selected partial paths are expanded by considering the partial paths leading to them and leading from them in a similar manner. This process is repeated until a satisfactory complete path from start to end has been found. In one such embodiment, a random sample of partial paths is selected at first to "seed" the process; in another embodiment, all initial partial paths (i.e., those emanating from the starting point of the trip) are used; in still another embodiment, all partial paths are initially considered.

Figure 6:
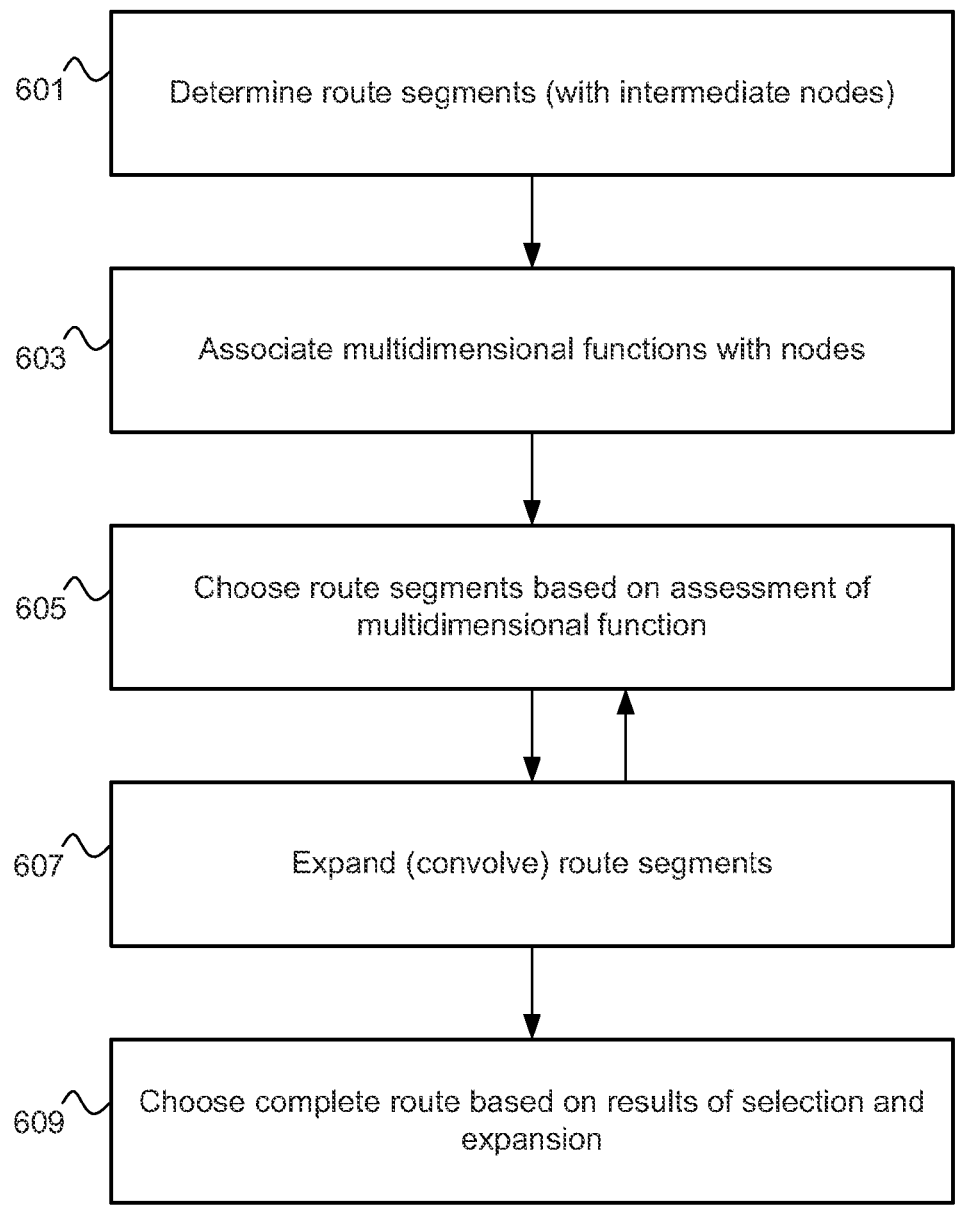
FIG. 6 illustrates a method for selecting a route, according to one embodiment.

FIG. 6 illustrates a method according to one such embodiment. In this method, processing begins by determining 601 a number of partial route segments, each defined at least in part by one or more intermediate nodes. Some partial route segments are defined from the start of the trip to an intermediate node, others are between two intermediate nodes, and still others are between an intermediate node and the end of the trip.

Each of the intermediate nodes is associated 603 with a multidimensional function. The functions are generally not known in advance, but are associated with the nodes after the route segments are determined, as illustrated in FIG. 6.

Next, assessment of at least some of the route segments is undertaken with respect to the multidimensional functions. In one embodiment, the assessment is actually performed with respect to the end node defining the segment, since that node relates to the conditions existing at the completion of the segment. In some embodiments, all route segments are considered in this manner, but for situations involving large numbers of route segments, such processing is not necessary or desirable. Instead, a subset of route segments is considered for assessment. Based on the assessment, there may be certain nodes that are considered unworkable, undesirable, desirable or optimum (in the local sense). As mentioned above, in one embodiment, the best 10% of the paths are chosen 605 for expansion processing 607.

Expansion processing 607 then takes a selected route segment and expands it. In one embodiment, such expansion is implemented by convolving the route segment with a subsequent route segment sharing a common intermediate node, thereby defining a new (and longer) partial route segment. In other embodiments, expansion is implemented by convolving the route segment with a prior route segment sharing a common intermediate node. It should be appreciated that in some embodiments, multiple expansions can also be used (i.e., multiple subsequent expansions or a subsequent expansion coupled with a prior expansion). Processing then returns to step 605 with the newly defined set of route segments, and the choosing 605 and expanding 607 are repeated. In some embodiments, dynamic programming techniques are used to efficiently accomplish aspects of the iterative choosing 605 and expanding 607 processing.

Eventually, one or more complete paths will be identified in this manner. In one embodiment, processing completes by choosing 609 such complete route. In other embodiments, once a complete path is identified processing continues in the iterative fashion described above until one or more thresholds are reached, e.g., five valid complete routes are identified, three routes are identified that are no better than an already identified route, or processing to identify additional complete routes has taken over 0.3 seconds. At that point, a complete route is chosen 609.

Those of skill in the art will recognize that such methods are usable for many applications other than selecting a preferred flight path. To the extent physical situations can be described incrementally and viewed as consuming resources, and at least one element of the solution varies continuously so as to enable the construction of a multidimensional function, a preferred solution, or path, can be selected as described herein. For example, consider a project planning situation such as shipbuilding. There are many temporal and physical paths that can be chosen for building a ship, each of which may be associated with positive and negative attributes. The resource consumed may be time, or may be the labor cost involved in constructing the ship. One resource that varies continuously is the amount of overtime labor used, and as long as each intermediate point (i.e., node or partial construction schedule) can be described as having some cost/benefit function, the overall preferred solution can be determined in the manner described herein. Thus, a partial path as described here may not necessarily be a geographical path of travel, but instead may represent a path to completion of a larger task (which itself may be considered the overall path).

The techniques described herein are also usable with other optimization schemes, for instance those described in commonly owned U.S. Pat. No. 8,010,242, the contents of which are hereby incorporated by reference. As a first specific example, such techniques can be combined with refueling strategies, whether at refueling waypoints or by way of in-flight refueling. Further, allowable usable payloads can be determined as detailed in that patent, by considering as the allowable payload the maximum payload that maintains at least the required fuel reserve based on the determination of excess fuel at the end of each flown segment of a route. The allowable payload for each segment is then simply the excess fuel.

Figure 5:
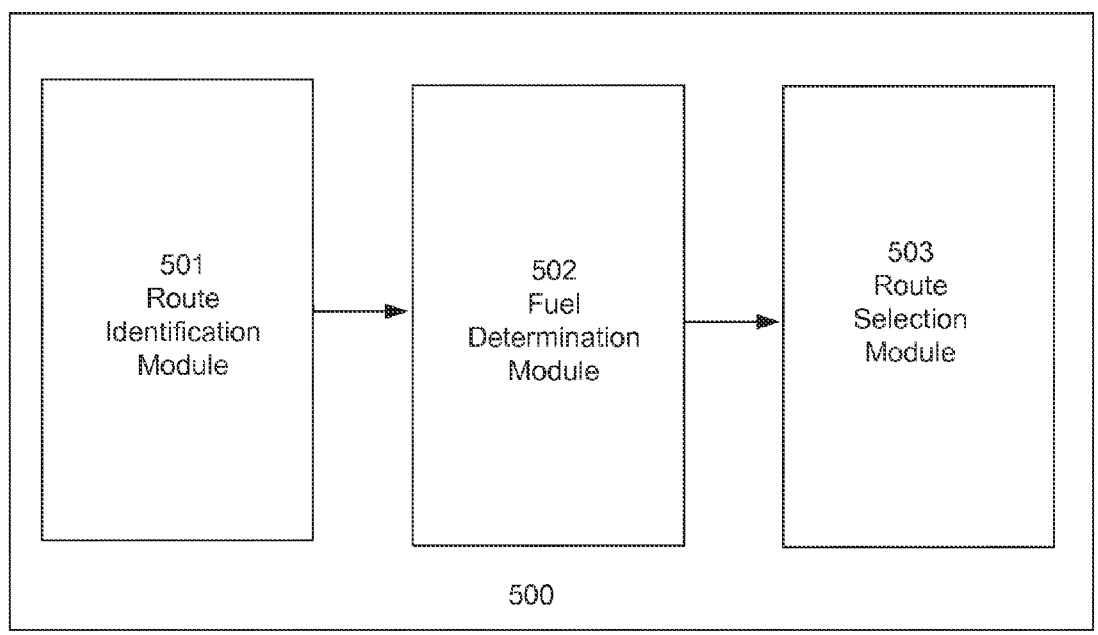
FIG. 5 depicts modules for implementing a system according to one embodiment.

Referring now to FIG. 5, an exemplary system 500 to determine fuel and payload parameters according to the method discussed above includes a route identification module 501, a fuel determination module 502 and a route selection module 503. Each of these modules is preferably implemented in the computer system 200 referenced above. Route identification module 501 determines potential legal routes as detailed above in connection with FIG. 1. Fuel/duration determination module 502 determines, for each segment of each such route, the fuel and time required (i.e., the graph of FIG. 4) as previously. Route selection module 503 is used to choose a preferred route and, for that route, provide as output usable payload information as well as departure fueling requirements.

One of skill in the art will realize that the subject matter described herein is not limited to flight planning for aircraft, but could equally well be applied to any other effort that requires costly or limited resources, such as movement of troops based on limited locations at which food and water are available.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the words "a" or "an" are employed to describe elements and components of embodiments. This is done merely for convenience and to give a general sense of the subject matter. This description should be read to include one or at least one and the singular also includes the plural unless it is obvious that it is meant otherwise.

Upon reading this disclosure, those of skill in the art will appreciate still additional alternative structural and functional designs for a system and a method for flight planning and, more generally, other efforts that involve various factors in a similar manner. For instance, while the particular embodiments discussed above involve four dimensional search, in some applications search in additional dimensions may be appropriate and can be accomplished in a similar manner. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is defined only by the following claims.

What is claimed is:

1. A computer-implemented method of preparing a vehicle for a trip having a start point and an end point, comprising:
   determining route segments, the route segments collectively comprising a plurality of intermediate nodes;
   evaluating, for each of a subset of the route segments, a corresponding multidimensional function representing a relationship among a plural set of factors, the corresponding multidimensional function including at least one of the plural set of factors continuously varying;
   repeatedly choosing another subset of the route segments responsive to the evaluation and a measure of acceptability at one or more of the nodes;
   expanding analysis to ones of the route segments adjoining each of said another subset of the route segments, the analysis comprising further choosing responsive to the evaluation and the measure of acceptability, expanding the analysis including convolving corresponding multidimensional functions of said another subset of the route segments with corresponding multidimensional functions of subsequent route segments; and
   selecting, responsive to said choosing and expanding, a preferred route.

2. The computer-implemented method of claim 1, wherein the plural set of factors includes fuel usage and trip duration.

3. The computer-implemented method of claim 1, wherein determining route segments is responsive, at least in part, to a preselected initial departure weight of the vehicle.

4. The computer-implemented method of claim 1, wherein said selecting includes performing, for one or more of the route segments, a weighted evaluation of the plural set of factors based on weighting factors, each of the weighting factors indicating a relative importance of a corresponding one of the plural set of factors.

5. The method as in claim 1, further comprising fueling the vehicle responsive to the preferred route and a desired payload.

6. The method as in claim 1, wherein the subset of the route segments are partial route segments.

7. A non-transitory computer-readable storage medium storing executable computer program code for preparing a vehicle for a trip having a start point and an end point, the computer program code comprising instructions for:
   determining route segments, the route segments collectively comprising a plurality of intermediate nodes;
   evaluating, for each of a subset of the route segments, a corresponding multidimensional function representing a relationship among a plural set of factors, the corresponding multidimensional function including at least one of the plural set of factors continuously varying;
   repeatedly choosing another subset of the route segments responsive to the evaluation and a measure of acceptability at one or more of the nodes;
   expanding analysis to ones of the route segments adjoining each of said another subset of the route segments, the analysis comprising further choosing responsive to the evaluation and the measure of acceptability, expanding the analysis including convolving corresponding multidimensional functions of said another subset of the route segments with corresponding multidimensional functions of subsequent route segments; and selecting, responsive to said choosing and expanding, a preferred route.

8. The non-transitory computer-readable storage medium of claim 7, wherein the plural set of factors includes fuel usage and trip duration.

9. The non-transitory computer-readable storage medium of claim 7, wherein determining potential routes is responsive, at least in part, to a preselected initial departure weight of the vehicle.

10. The non-transitory computer-readable storage medium of claim 7, wherein said selecting includes performing, for one or more of the route segments, a weighted evaluation of the plural set of factors based on weighting factors, each of the weighting factors indicating a relative importance of a corresponding one of the plural set of factors.

11. The non-transitory computer-readable storage medium of claim 7, wherein the instructions further comprise instructions for determining fueling of the vehicle responsive to the preferred route and a desired payload.

12. The non-transitory computer-readable storage medium of claim 7, wherein the subset of the route segments are partial route segments.

13. A computer system for preparing a vehicle for a trip having a start point and an end point, comprising:
  a non-transitory computer-readable storage medium storing executable computer program code, the computer program code comprising instructions for:
  determining route segments, the route segments collectively comprising a plurality of intermediate nodes;
  evaluating, for each of a subset of the route segments, a corresponding multidimensional function representing a relationship among a plural set of factors, the corresponding multidimensional function including at least one of the plural set of factors continuously varying;
  repeatedly choosing another subset of the route segments responsive to the evaluation and a measure of acceptability at one or more of the nodes;
  expanding analysis to ones of the route segments adjoining each of said another subset of the route segments, the analysis comprising further choosing responsive to the evaluation and the measure of acceptability, expanding the analysis including convolving corresponding multidimensional functions of said another subset of the route segments with corresponding multidimensional functions of subsequent route segments; and
  selecting, responsive to said choosing and expanding, a preferred route; and
  a processor for executing the computer program code.

14. The computer system of claim 13, wherein said selecting includes performing, for one or more of the route segments, a weighted evaluation of the plural set of factors based on weighting factors, each of the weighting factors indicating a relative importance of a corresponding one of the plural set of factors.

15. A computer-implemented method of selecting a preferred path, comprising:
  determining path segments, the path segments collectively comprising a plurality of intermediate nodes;
  evaluating, for each of a subset of the path segments, a corresponding multidimensional function representing a relationship among a plural set of factors, the corresponding multidimensional function including at least one of the plural set of factors continuously varying;
  repeatedly choosing another subset of the path segments responsive to the evaluation and a measure of acceptability at one or more of the nodes;
  expanding analysis to ones of the path segments adjoining each of said another subset of the path segments, the analysis comprising further choosing responsive to the evaluation and the measure of acceptability, expanding the analysis including convolving corresponding multidimensional functions of said another subset of the path segments with corresponding multidimensional functions of subsequent path segments; and
  selecting, responsive to said choosing and expanding, the preferred path.

16. The computer-implemented method of claim 1, wherein a multidimensional function corresponding to one of the route segments graphically represents the relationship among the plural set of factors.

17. The computer-implemented method of claim 1, wherein said choosing comprises discarding one or more route segments going to or from one of the intermediate nodes for which there is no acceptable solution according to the measure of acceptability.

18. The computer-implemented method of claim 1, wherein the chosen subset of the route segments are chosen based on relative properties of the evaluation.

* * * * *